(12) United States Patent
Liu et al.

(10) Patent No.: US 10,334,790 B2
(45) Date of Patent: Jul. 2, 2019

(54) SUBSTRATE AUTO-PAVER FOR TABLE-TOP CULTURE

(71) Applicant: JIANGSU UNIVERSITY, Jiangsu (CN)

(72) Inventors: Jizhan Liu, Jiangsu (CN); Haijun Peng, Jiangsu (CN); Jizhang Wang, Jiangsu (CN); Pingping Li, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 15/523,176

(22) PCT Filed: Jan. 25, 2016

(86) PCT No.: PCT/CN2016/071932
§ 371 (c)(1),
(2) Date: Apr. 28, 2017

(87) PCT Pub. No.: WO2017/113452
PCT Pub. Date: Jul. 6, 2017

(65) Prior Publication Data
US 2018/0288947 A1    Oct. 11, 2018

(30) Foreign Application Priority Data
Dec. 31, 2015  (CN) .......................... 2015 1 1013914

(51) Int. Cl.
*A01G 9/08*   (2006.01)
(52) U.S. Cl.
CPC ..................... *A01G 9/081* (2013.01)
(58) Field of Classification Search
CPC .......... A01G 9/081; A01G 9/08; B65G 19/04; B65G 43/08; B65G 19/06; B65G 19/08
(Continued)

(56) References Cited

U.S. PATENT DOCUMENTS

| 3,726,041 A | * | 4/1973 | Ota ........................ A01G 9/081 47/1.01 R |
| 3,782,033 A | * | 1/1974 | Hickerson .............. A01G 9/081 222/56 |

(Continued)

FOREIGN PATENT DOCUMENTS

| CN | 202455953 U | 10/2012 |
| CN | 104355050 A | 2/2015 |

(Continued)

*Primary Examiner* — Trinh T Nguyen
(74) *Attorney, Agent, or Firm* — Saliwanchik, Lloyd & Eisenschenk (57) ABSTRACT

The invention presents technology for elevated cultivation comprising an automatic paver and man-machine collaboration matrix control method in the field of agricultural equipment.
The substrate auto-paver for the table-top culture machine is mainly composed of a moving car, a matrix and a matrix-packing mechanism, the substrate material in the cabinet, an evenly paving mechanism that realizes double-sided blanking, and a remote control. The manual push-pull arm is employed to ensure that the return wheel touches the ground, using the matrix agencies to van automatically. The remote control is used to move the car into the elevated inter-row cultivation bed, and then, the double-sided blanking and evenly paving mechanism is automatically activated until the track wheel falls into the slot on the skeleton. By means of the bending type of chain transmission mechanism, the soilless culture substrates are automatically conveyed owing to the bilateral symmetry of blanking trough. A moving trolley drives the stirring device along the elevated bed. Thus, an evenly mixed matrix is obtained for cultivation in the tank. A rubber band, which is fixed on the back board of the stirring device, makes the matrix flat and level. The challenges of substrate packing, transportation, and mobile paving are being solved through collaboration between (Continued)

many institutions and by means of some artificial automatic intervention, which can help realize good adaptability and convenient handling.

7 Claims, 7 Drawing Sheets

(58) Field of Classification Search
USPC .................................................. 47/1.01 P
See application file for complete search history.

(56) References Cited

U.S. PATENT DOCUMENTS

| 4,697,623 | A | * | 10/1987 | Bouldin | A01G 9/081 |
|---|---|---|---|---|---|
| | | | | | 141/80 |
| 5,315,810 | A | * | 5/1994 | Eaton | A01G 9/081 |
| | | | | | 141/283 |
| 5,394,670 | A | * | 3/1995 | Visser | A01G 9/081 |
| | | | | | 141/125 |
| 2012/0285580 | A1 | * | 11/2012 | Ellis | A01G 9/081 |
| | | | | | 141/1 |
| 2015/0373925 | A1 | * | 12/2015 | Lando | A01G 9/081 |
| | | | | | 47/1.01 P |

FOREIGN PATENT DOCUMENTS

| CN | 104412863 A | 3/2015 |
|---|---|---|
| JP | H02177824 A | 7/1990 |
| JP | H03180122 A | 8/1991 |
| JP | H0951706 A | 2/1997 |
| JP | H0998670 A | 4/1997 |
| JP | H10215694 A | 8/1998 |
| JP | H10248399 A | 9/1998 |
| JP | H11127696 A | 5/1999 |
| JP | 2003180168 A | 7/2003 |
| JP | 2011130692 A | 7/2011 |
| NL | 1010255 C2 | 4/1999 |

* cited by examiner

SUBSTRATE AUTO-PAVER FOR TABLE-TOP CULTURE

CROSS REFERENCE TO RELATED APPLICATIONS

This application is a National Stage Application of International Application Number PCT/CN2016/071932, filed Jan. 25, 2016; which claims priority to Chinese Application No. 201511013914.2, filed Dec. 31, 2015; both of which are incorporated herein by reference in their entirety.

FIELD OF THE INVENTION

The invention is related to the field of agricultural equipment, and in particular, to automatic paving machines with a substrate for elevated cultivation.

BACKGROUND OF THE INVENTION

Substrate-spreading operation is the main process in the construction of the elevated crop cultivation. However, long-term use of substrates will lead to the accumulation of pathogenic microorganisms, decreased matrix ventilation, and high water retention.

These situations will seriously affect the growth of strawberry and lead to the occurrence of diseases and prevalence of insect pests. Therefore, regular replacement of substrates is a the basic requirement in strawberry cultivation. However, the matrix is transported along distances of tens of meters overhead on the cultivation bed spread. These bed spreads are based on the dictum "operation procedure, the great quantity of work," and the required paving from the perspectives of filling, transporting, feeding, and blanking are employed to flatten them. The high degree of difficulty and super strength of the human work industry are the main obstacles to the development of elevated cultivation.

Depending on the matrix material and filling, several matrix-filling machines are available: for example, JAVOs (Holland) standard-type matrix filling machine, Demtec (Belgium)'s SMART matrix-filling machine, and the seedling-feeding machine by matrix developed by Saidelin Machinery Co. Ltd. These are the main commercially available equipment. Yuyong, Xin, Huanyu, and Kuichuan conducted matrix seedling-feeding machine design and parameter analysis (Wei Yuyong et al. Facilities horticultural substrate packing machine design and performance research. Journal of Zhejiang University (Agriculture and Life Science Edition), 2013, 39 (3): 318-324; Qu Xin. Forestry seedling. Matrix tray filling machine structure design. The research of agricultural mechanization, 2013, (5): 88-91; Jiang Huanyu et al. Adjust the coating amount of substrate covering machine [P]. China patent: 3141868.6; Sheng Kuichuan et al. Automatic feeding device [P]. China patent plug seedling medium: 200410025088.9.). However, the existing matrix mixing and feeding equipment have the following shortcomings:

(1) The Existing Machines are Large and Immobile.

The existing matrix-mixed material and the material-feeding equipment are fixed on the base plate or the flower pot, and a large fixed table structure is adopted. The equipment itself does not have the ability to move, and it is too large. Hence, adjustment of the elevated cultivation bed for substrate transport and the length of the bed in the direction of movement of paving operations cannot be realized.

(2) The Existing Equipment does not have a Matrix-Packing Function.

The existing equipment does not solve the problem of the mechanical assembly of the matrix. Manual packing and other configurations of substrate-packing equipment involve the problems of intensive labor, labor occupation, and high cost. However, for small mobile equipment, which is required for laying the elevated cultivation bed substrate, the need for container packing is significant.

(3) The Existing Equipment Cannot Achieve Multilink Operation.

To realize enhanced mobile stalls, the two processes of elevating of the matrix to the box and loading the box on to the groove on the elevated cultivation material should be carried out. However, the existing equipment cannot achieve these processes, as it is incapable of multilink operations such as filling, transport, and the feeding and the flattening of complex operations.

The following requirements should be met to resolve the key difficulties:

(1) Coordination of Packing and Mobile Operations

The functions of loading, transporting, paving, feeding, and blanking should be achieved by automatic paving for matrix elevated cultivation. The equipment should facilitate motion control and enable loading, transporting, and paving "before and after" the three links have been made. In addition, feeding and blanking, averaging three synchronous action link coordination, and parameter-matching problem need to be addressed.

(2) Fluidity of the Matrix in the Box

Owing to the differences in the fluidity of the matrix, the pile arch phenomenon may occur: that is, matrix in the local area box is piled into Yamagata, while the other regions remain vacant. During the feeding process, the phenomenon of dig box may occur, and the box near the feeding area and other areas of matrix may be removed to maintain status quo. These two phenomena can cause the failure of the automatic paving matrix.

(3) Adaptability of the Elevated Dimensions

Because of the cultivation of elevated construction error, change existing elevated ups and downs and wide spacing, frame. From the perspective of elevated cultivation, the automatic paving equipment must have the ability to adapt to the overhead errors in the horizontal and vertical directions.

SUMMARY OF THE INVENTION

The existing equipment cannot meet the requirements for elevated cultivation bed operation. The invention provides an automatic paver for elevated-cultivation-supporting matrix and a collaborative control method. The machine can be used for filling the elevated matrix paving material, blanking, and flattening in the multi-link automatic operation.

In order to solve the above technical problems, the specific technical scheme adopted by the invention is as follows:

The invention includes a moving car (3), an automatic oblique pulling-type substrate-packing device, a substrate box (6), the substrate material in a cabinet (26), a floating-support-type double-side blanking device, and uniform discharging devices. The matrix box (6) is installed on the moving car (3), and a diagonal automatic matrix boxing device is installed at the back of the matrix box (6). The matrix box (6) is fixed to the cabinet containing the substrate material (26). The double-side blanking and evenly paving mechanism is installed in front of the matrix box (6). The uniform discharging devices are installed on both sides of the exit, that is, below the double-side blanking and evenly paving mechanism.

The substrate material in the cabinet includes a bending-type scraper feeder (26), a dc motor (12), and a thin tension wheel (25). The bending-type scraper feeder device (26) has a lower part (32) and an upper part (33).

The double-side blanking and evenly paving mechanism consists of a matrix box (6), floating trough (7), push plate (8), flat (9), (10), straight-moving element-mounting plate (11), (28), and the level of the vertical slide rail (29). The front of the matrix box (6) has two left and right symmetrical oblique dropping grooves (35). Inside the box and perpendicular to the two left and right symmetrical oblique dropping grooves (35), a plate (27) is set. Two floating chutes (7) are set along the vertical and horizontal slide rails (28) (29) symmetrically arranged in the substrate (6) in front of the outer box. The oblique chute (35) below the opening is connected to the floating chute (7) above the opening. The direct-moving element (10) is vertically arranged on the mounting plate (11) along the central line of the front side of the matrix box (6). A flat level (9) is installed at the end of the direct-moving element (10).

The copying discharging device consists of a flexible scraper (5) and a mixing mechanism (13) for even spreading; this mechanism (13) includes a support member (30) and bearing (31), drive shaft (36), thick elastic sleeve (37), and a unifoini shop (38). The transmission shaft (36) is fixed and has two evenly spread parts (38), and the compact elastic sleeve (37) is installed between the bearing (31) and the spare parts (38).

The diagonal matrix automatic boxing device comprises a scraper conveyor (4), an additional spring hook (15), short axis (19), pin (20), connecting rod (21), port (22), contact switch (23), and lap (24). A shaft (19) is fixed on the exterior of the matrix box (6), and the rear lateral horizontal axis (19) is higher than the openings of the matrix box (6). A long pass trough (18) opens in the conveying direction of the scraper conveyor (4). The axis (19) can cross and slide in through the long pass trough (18). One end of a connecting rod (21) is hinged laterally to the matrix box (6). It (21) is installed in the middle of the short pin (20). The scraper conveyor (4) has a short groove (16) in the middle in the conveying direction. The short pin (20) stretches into a short groove and can slide in it (16). Below the scraper conveyor (4), a lap (24) is fixed. A hasp (22) is installed at the lower part of the outer wall of the matrix box (6). A contact switch (23) is installed in the hasp (22).

The discharging device is intended for copying walking in the frame. The copying discharging device consists of a flexible scraper (5) and a mixing mechanism (13), which ensures even spreading, and has a support member (30) and bearing (31), drive shaft (36), thick elastic sleeve (37), and (38) a uniform shop. The transmission shaft (36) is fixed and has two evenly spread parts (38), and a compact elastic sleeve (37) is installed between the bearing (31) and the spare parts (38). The distance between the center of the left and right elastic sleeves (37) is the same as the distance between the center of the W3 and the frame (1) of the two sides of the viaduct W.

The bending-type scraper feeder (26) divides into two parts because of the bending action at the feeder (33) into the upper and lower feeder (32). The lower feeder (32) is arranged on the feeder, and the upper feeder (33) is tilted at an angle depending on the dynamic and static angle matrix accumulation matrix, which lie between the stacking angle ($\delta_1 \leq \alpha \leq \delta_0$).

The angle of the inclined chute (35) is greater than or equal to the dynamic stacking angle of the matrix. The dip angle of the floating drop trough (7) is equal to the dip angle of the inclined chute (35).

The distance between the center of the left and right elastic sleeves (37) is the same as the distance between the center of the W3 and the frame (1) of the two sides of the viaduct W.

The oblique chute (35) below the opening width W1 and floating chute (7) above the opening gap or the W2 transverse lateral width should not be less than the elevated cultivation bed groove along the skeleton (1). The maximum error distance W and the maximum error between the elevated on both sides of the cultivation bed are as follows:

$$W_2 \geq W_1 + \max(\varepsilon_1, \varepsilon_2)$$

In the formula, $\varepsilon_1$ the groove (1) along the skeleton. The maximum error distance is W, where $\varepsilon_2$ is the maximum error in the distance between the sides of the elevated cultivation bed.

That feeding and blanking are realized by spreading three aspects of the "synchronous" coordinated operations. The ratio of speed of the mobile car (3) with that of the scraper conveyor (4) is $v_1$:

$$\frac{v}{v_1} = \frac{16 V_0}{L_1 \cdot \pi \cdot v \cdot W^2}$$

Each scraper feeder (34), for a quality delivery of V0, involves the following two types of decisions:

$$V_0 \geq \frac{1}{2} B_1 H_1^2 \cdot \cot(\delta_0 - \delta_1), (B_1 \cdot \cot(\delta_0 - \delta_1) \leq L_1)$$

$$L_1 H_1 B_1 - \frac{L_1^2 B_1}{2\cot(\delta_0 - \delta_1)} \leq V_0 \leq L_1 H_1 B_1, (B \cdot \cot(\delta_0 - \delta_1) > L_1)$$

In the formula, H1 is the height of a feeder scraper (34) and B1 is its width, while L1 is the distance between the two adjacent scraper feeders (34).

That the two sides of the elevated cultivation bed are provided with horizontal and parallel grooves along the skeleton (1), and the groove of the frame (2) is set between the two sides of the groove.

The advantages of the invention are as follows: high pair mechanism and implementation of the push pull automatic switch and reset packing; the bending-type feeding box that solves the problems of arch heap and dig by means of the vertical-horizontal blanking and double floating frame-walking discharge of the solution to the matrix; functions of packing and transportation to the elevated cultivation bed, feeding and uniform spread filling operations; good adaptability to elevated cultivation bed; and a matrix control method that is simple, labor-saving, and reliable.

NOTES 1. slots along the skeleton, 2. culture tank, 3. moving car, 4. the scraper conveyor, 5. the flexible scraper, 6. the matrix box, 7. floating trough, 8. the push plate, 9. flat, 10. straight-moving element, 11. support plate, 12. dc motor, 13. mixing mechanism, 14. wheel, 15. spring hook, 16. short pass trough, 17. notch, 18. long grooves, 19. short axis, 20. short pin, 21. the connecting rod, 22. the port, 23. contact switch, 24. lap, 25. thin tension wheel, 26. bending scraper feeder, 27. plate, 28. vertical slide, 29. horizontal slide, 30. support member, 31. bearing, 32. the lower part, 33. the upper part, 34. scraper, 35. inclined chute, 36. transmission shaft, 37. thick elastic sleeve, 38. uniform paving, and 39. Scraper.

The Concrete Implementation Method

Figure 1:
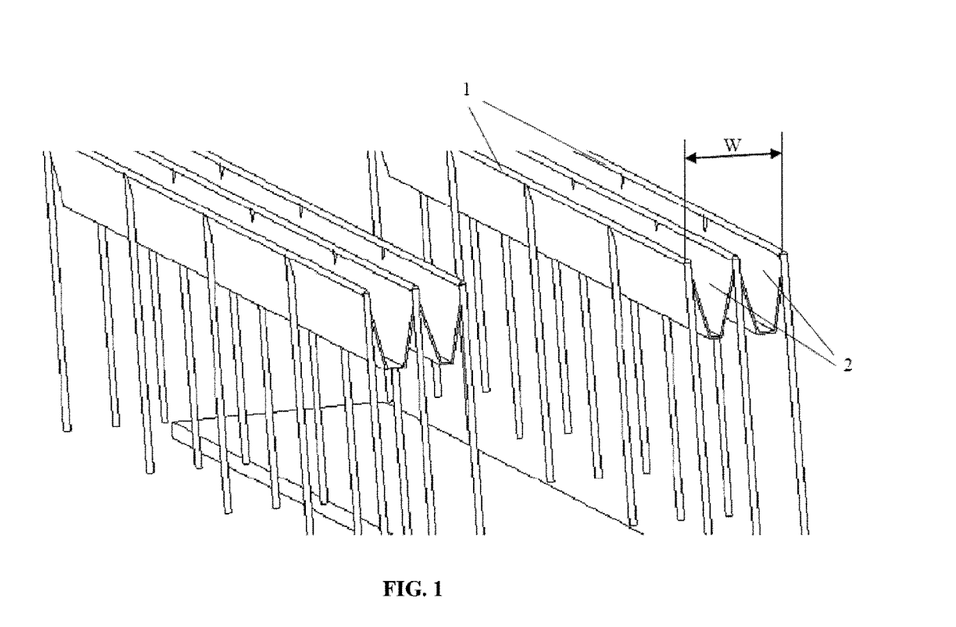
FIG. 1 shows a schematic diagram of the structure of the elevated cultivation bed.

FIG. 1 shows the structure characteristics of the elevated cultivation bed suitable for the automatic spreading machine and the man-machine collaboration control method of elevated cultivation, which are suitable for elevated cultivation, are as follows: On both sides of the elevated cultivation bed with horizontal and parallel grooves along frame 1, the distance between the two sides of the groove is W, and culture groove 2 is arranged between the two sides of the groove along frame 1.

Figure 2:
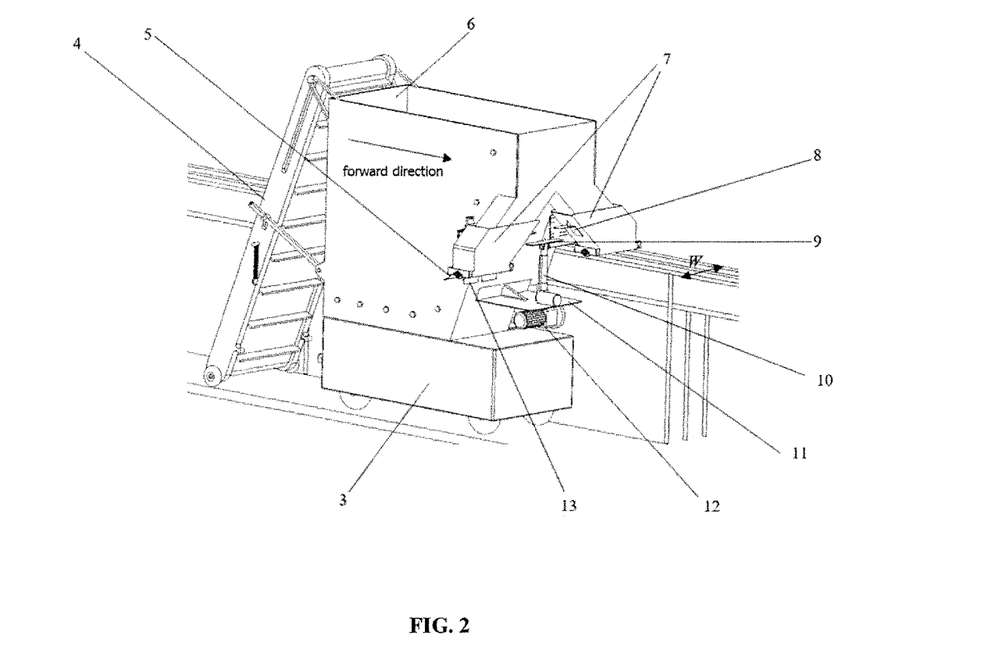
FIG. 2 shows the overall structure of the automatic paving machine for the cultivation.
Figure 3:
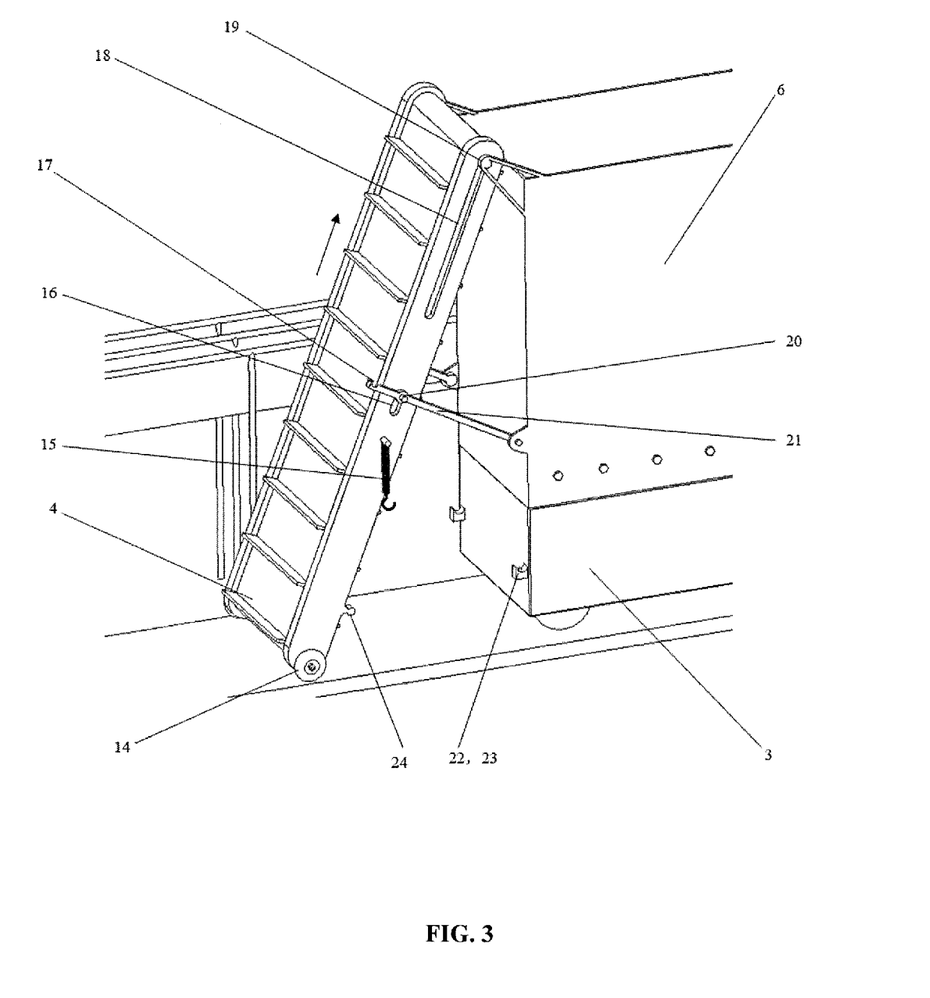
FIG. 3 shows a schematic diagram of the automatic cable-pulling-type substrate-packing device.

FIG. 2 and FIG. 3 show that the substrate auto-paver for the table-top culture machine has the mobile trolley 3, automatic packing device, inclined-type matrix box (6), box-bending-type feeding device, floating support-type bilateral blanking device, and rack profile discharging device for walking. The matrix box 6 is installed on the top of the mobile trolley 3. The automatic oblique pulling-type substrate-packing device is installed at the back of the matrix box 6. The bending scraper feeder 26 is installed in the matrix box 6. The floating support-type double-side blanking device is set in front of the matrix box 6, and the bottom side outlets of the floating-support double-blanking device are installed on the walking frame discharging device profile. The matrix box 6, automatic packing device, moving car 3, the bending-type feeding device, floating support-type bilateral feeding device and rack walking discharging device profile are all symmetrically set along the same central line. Depending on these devices, the sequence number to achieve elevated paving loading, transporting, feeding, blanking, and flattening of multi-link operations is determined.

FIG. 3 shows that the automatic inclined-type packing device comprises a scraper conveyor 4, an additional scraper conveyor 15, a shaft axis 19, a short pin 20 and connecting rod 21, a port 22, a contact switch 23, and a lap 24. The scraper conveyor is set at the lower end of the scraper conveyor 4. The short axis 19 is horizontally fixed on the outer side of the matrix box 6, and is set higher than the upper opening of the matrix box 6. The scraper conveyor 4 is parallel to the short axis 19. The long groove 18 opens in the conveying direction of the upper part of the side wall of the scraper conveyor 4 on the axis 19 through the long groove 18 and through sliding groove 18. The axis 19 can slide into the groove 18.

One end of the connecting rod is hinged at the rear outer side of the matrix box 6, and the short pin 20 is set in the middle of the connecting rod. The extended end of the connecting rod is arranged at notch 17. In the middle of the side wall of the scraper, conveyor 4 opens into a short slot 16 in the conveying direction of 4, and the short pin 20 extends into the through groove 16 and can slide into the through groove 16.

The spring hook 15 is arranged below the short slot 16, and the spring hook 15 can be manually hung into the extended end notch 18 of the connecting rod 21.

The lap 24 is fixed on the side wall below the scraper conveyor 4. The opening 22 is fixed to the lower outer wall of the matrix box 6. A contact switch is installed in the opening 22 of the building 23. By means of a manually propelled scraper conveyor 4, the lap 24 can be linked into and out of the port 22 and can trigger the contact switch 23 to open or close to realize the control of the staring and stopping of the scraper conveyor drive.

Figure 4:
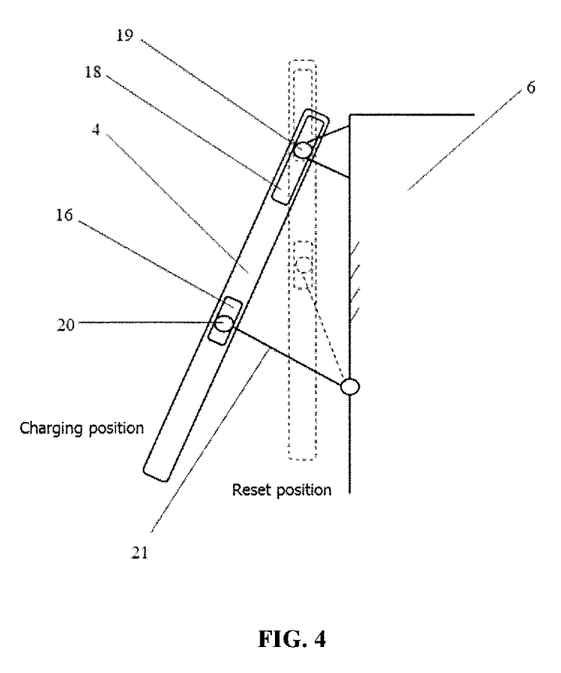
FIG. 4 shows the automatic skew movement diagram of the matrix loading mechanism.

As shown in FIG. 4, the high pair mechanism of the automatic oblique pulling-type substrate packing device is composed of the scraper conveyor 4, a short pin 20, a connecting rod 21, and the matrix box 6 in which the short pin 20 and short pass through 16 constitute a high two-degree-of-freedom pair. The parts 19 and 18 form a high side with two degrees of freedom.

The connecting rod 21 and the outer side of the rear lateral of the matrix box 1 is a pair with a low degree of freedom. The planar high-pair mechanism has one degree of freedom. By pushing the scraper conveyor, the short pin 20 can be made to slide into the short groove 16, and the 19 axis can slide into the long groove 18. Thus, we can realize the charging station and reset stop station of scraper conveyor 4.

The elevated matrix paving loading operation process proceeds as follows:

(1) The artificial push scraper conveyor 4 from the first lap the contact switch 23 is closed, and the driving device starts to work and drives the scraper conveyor 4;

(2) The mechanism 4 is pulled until the wheel 14 touches the ground;

(3) The spring hook 15 is then hung into the long groove 18 of the connecting rod 21 to prevent charging when the scraper conveyor 4 retracts;

(4) The mobile car 3 carries scraper conveyor 4 moves toward the matrix 6, and the automatic scraper conveyor 4 will transport the matrix into the matrix box 6;

(5) Until the matrix box is filled, the artificial spring hook 15 is removed, and the scraper conveyor 4 is pulled to the reset stop position; the lap 24 is set into the port 22, triggering the contact switch 23 back to the off state, and thus, the driving device finally stops.

Figure 5:
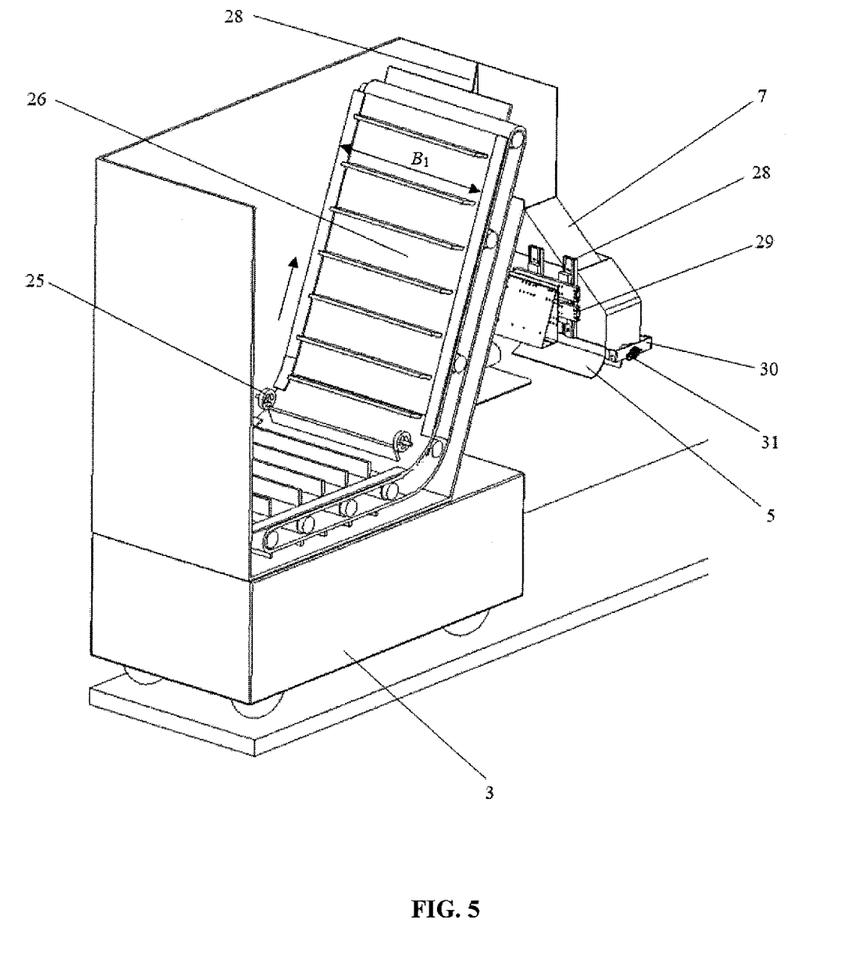
FIG. 5 shows a schematic diagram of the bending-type feeding device in the box.

FIG. 5 shows that the bending-type feeding device comprises a bending scraper feeder 26, a dc motor 12, and a thin tension wheel 25. The two symmetrical thin tension wheels 25 are horizontally mounted on the sidewall of the matrix box 6, and the tension wheel 25 is installed on the upper part of the bending scraper feeder 26.

Figure 6:
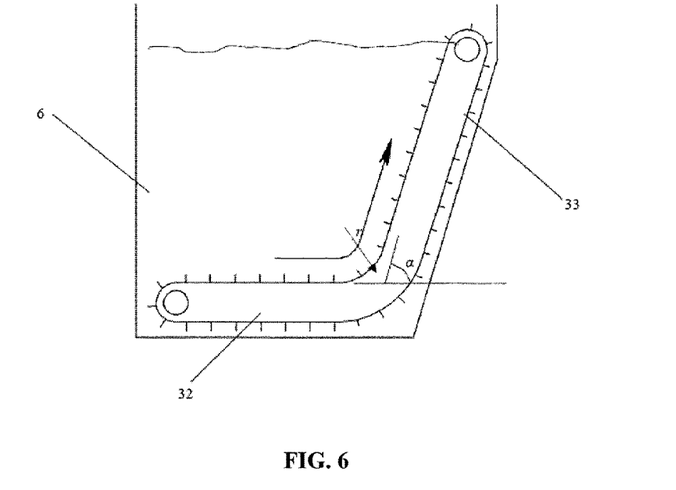
FIG. 6 presents the working principle of the bending and loading device in the box.

FIG. 6 shows that the bending scraper feeder 26 comprises the lower part 32 and the upper part 33. Here, 32 is a horizontal feeder. Further, the angle of the upper part of the feeder 33 is α. The dynamic accumulation angle of the matrix is less than $\delta_1$, and the static accumulation angle of the alpha is less than $\delta_0$. In the mixed matrix, as an example, the dynamic and static accumulation angle $\delta_1$ and angle $\delta_0$ are 45° and 64°, 45°≤α≤64°. At the same time, the fillet radius r is more than half the size of the minimum bending radius $r_0$ for transmission.

When charging, the automatic packing device matrix inclined-type scraper conveyor 4 transports the matrix obliquely into the matrix box in the lower half of the feeder 32 and in the upper part of the upper feeder 33. Owing to the dynamic angle a that exceeds the accumulation of the matrix angle $\delta_1$, the first half of the matrix in feeder 33 falls into the feeder 32, effectively mitigating the loading phenomenon of arch pile.

Figure 7:
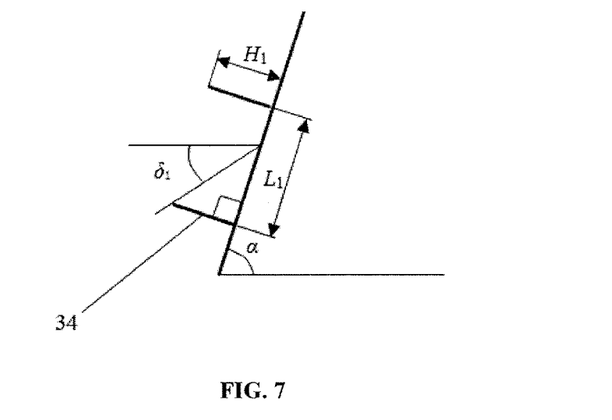
FIG. 7 shows the difference of the bending scraper bighorn feeder feeding volume diagram.
Figure 8:
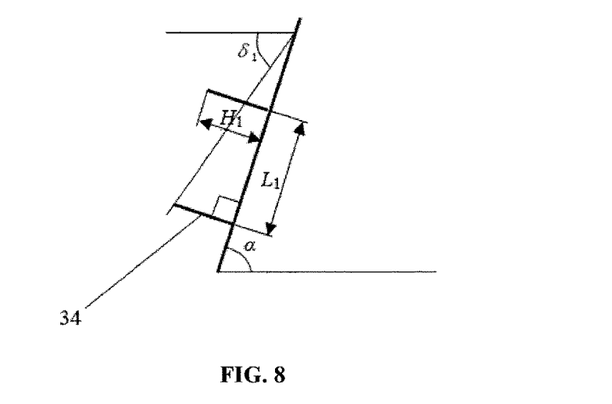
FIG. 8 shows the small angle between the scraper bending for the feeder feeding volume.

During feeding operation, the motor 12 drives the bending-type feeding device in the box 26 to transport the matrix to an oblique and higher position. From FIG. 7 and FIG. 8, it is seen that V0-based quality of the feeder scraper 34 is determined by the static dynamic matrix stacking angle $\delta_1$≤α≤matrix stacking angle $\delta_0$.

$$\text{Large angle difference: } V_0 \geq \frac{1}{2} B_1 H_1^2 \cdot \cot(\delta_0 - \delta_1), \quad (1)$$
$$(B_1 \cdot \cot(\delta_0 - \delta_1) \leq L_1)$$

$$\text{Small angle difference: } L_1 H_1 B_1 - \frac{L_1^2 B_1}{2\cot(\delta_0 - \delta_1)} \leq V_0 \leq L_1 H_1 B_1, \quad (2)$$
$$(B \cdot \cot(\delta_0 - \delta_1) > L_1)$$

In the formula, H1 is the height of the feeder scraper (34), and B1 is its width; L1 is the distance between two adjacent scraper feeders (34).

Every feeder scraper 34 meets the quality requirements for V0, which is based on formula (1) and (2), to ensure the quality of the bending scraper feeder 26.

At the same time, because the matrix in box 6 accumulates above the bending scraper feeder 26, the digging phenomenon can be avoided in the feeding process.

FIG. 2, shows that the floating-support double-side blanking device consists of a matrix box 6, floating chute 7, push plate 8, flat 9, straight-moving element 10, installation plate 11, vertical slide 28, and horizontal slide rail structure 29.

Figure 9:
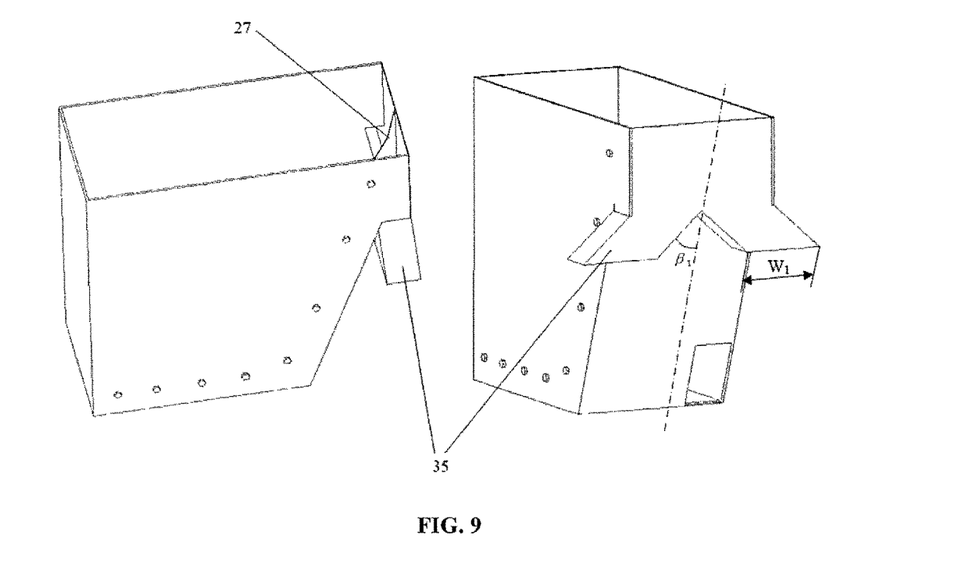
FIG. 9 shows a schematic diagram of the structure of the matrix box.
Figure 10:
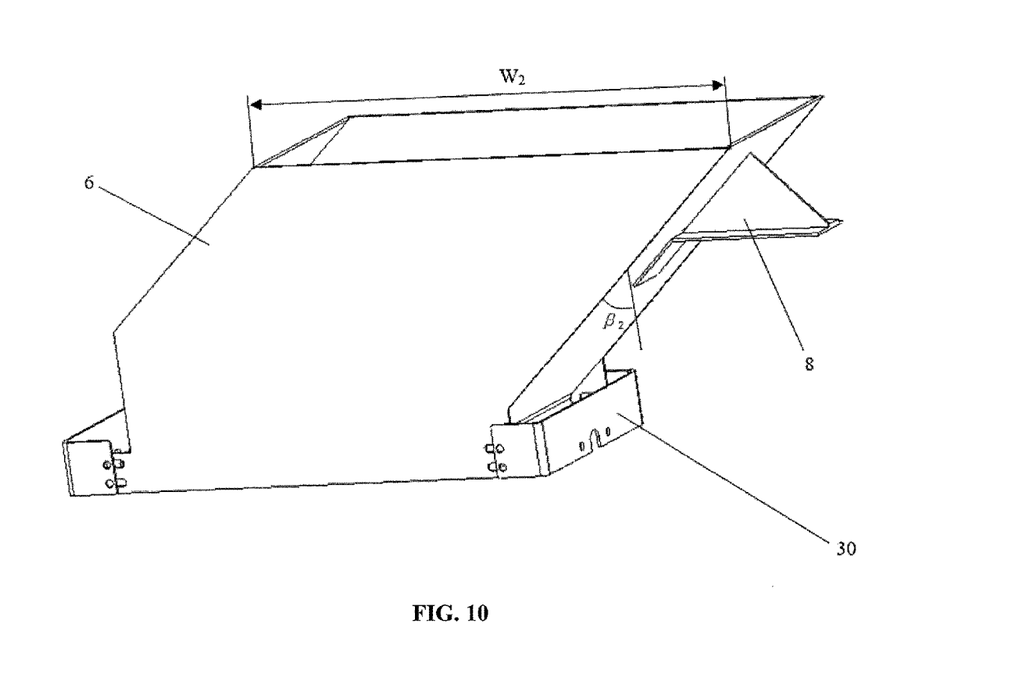
FIG. 10 shows a schematic diagram of the floating structure.

From FIG. 2, FIG. 9, and FIG. 10, it is seen that the front of the matrix box 6 has two left and right symmetrical inclined troughs 35, with an angle β1 that is higher than the dynamic stacking angle of the matrix δ1. Plate 27 that medially passes along the vertical center line of the chute 35 has a symmetric distribution. Two floating troughs 7 are fixed by levels vertical slide rail and car 28 and 29, and they are symmetrically arranged in front of the lateral matrix box 6. Further, β2 of the floating drop trough 7 is equal to the dip angle of the inclined chute 35. On the bottom of the floating chute is inclined to the lower part of the chute 35. The floating chute 7 is fixed on the side wall of the level of the push plate 8 and straight-moving element 10 along the center line of the vertical mounting plate installed outside the front of the matrix box 6 of the 11 box matrix, direct action element 10, and terminal installation level flat 9.

In FIG. 2, it is seen that the uniform discharging device is mainly composed of 5 and 13, and a mixing mechanism 13 has a support member 30, a bearing 31, a transmission shaft 36, a tight elastic sleeve 37, and a uniform paving 38. An elastic scraper 5 is installed at the lower part of the bottom opening of each floating material groove 7. The supporting piece 30 is fixed on the lower opening of the floating blanking groove 7, and the transmission shaft 36 is horizontally set on the supporting part through a bearing 31 level. From FIG. 11, it is seen that the drive shaft 36 is fixed around two pieces of the uniform shop 38, in 31 and 38 with a uniform bearing mounted between two thick elastic sleeves 37 from the center of W3. The elevated cultivation bed on both sides of the groove lie along the skeleton 1 and extend a distance W. The surface 38 of the uniform paving parts are uniformly distributed on the scraper 39.

In the matrix material, blanking and smoothing action synchronization is performed before the direct action of elements 10 and 9 rise flat end. Further, through the 28 level, the vertical slide rail 29 and by the slide effect, and by means of the push plate 8, two floating troughs 7 are moved along the inclined chute 35 obliquely. When the device enters the elevated cultivation bed aisle, the direct action elements 10 and 9 decline flat end. The two floating falling troughs 35 fall down to the drop 7 of the chute, and the elastic sleeve 37 falls down to the side groove along the frame 1. Mobile car 3 moves forward at uniform speed V along the aisle, as the scraper conveyor 4 and matrix box 6 move the matrix obliquely upward.

Because of the angle β1 and β2 exceed $\delta_1$, the plate matrix can fall on both sides of the inclined chute 35. The substrate is then dropped into a floating drop chute 7 and then onto the 38. The part 37 is rolled along the frame 1, and it drives the rotation of 38. The substrate is arranged into the cultivation groove 2 of the elevated cultivation bed. Then, the elastic scraper 5 scrapes the matrix in the groove.

When the elevated cultivation bed groove along the skeleton 1 has floating ups and downs, the vertical slide 28 causes vertical floating of trough 7. Errors may arise in the distance between the slots along the skeleton 1 and in the thick elastic sleeve 27. The horizontal slide 29 can cause the slide chute 7 level to float.

Always ensure the tight elastic sleeve 37 and the groove along the frame 1 roll well. Slide 29 can make cause horizontal floating of the trough 7 to ensure that the tight elastic sleeve 37 in the groove along the frame 1 rolls well. In order to ensure the horizontal floating of the trough 7, the opening of the lower part of the chute 35 has a transverse width W1 and a transverse space between the horizontal width of the upper opening of the floating trough 7 and a transverse width W2. The gap shall be not less than the maximum error of the distance between the W maximum error and the distance between the sides of the elevated cultivation bed 1:

$$W_2 \geq W_1 + \max(\varepsilon_1, \varepsilon_2) \quad (3)$$

In the formula, $\varepsilon_1$ is the maximum error in the distance W groove along 1 of the skeleton; $\varepsilon_2$ is the maximum error of the distance between both sides of the elevated cultivation bed.

To realize the synchronous operation of feeding, blanking, and spreading, the upper material, blanking, and spreading rate of the substrate should be consistent. In addition, the amount of material in the unit time should be able to fill the cultivation trough 2:

$$Q = S \cdot v \quad (4)$$

Figure 12:
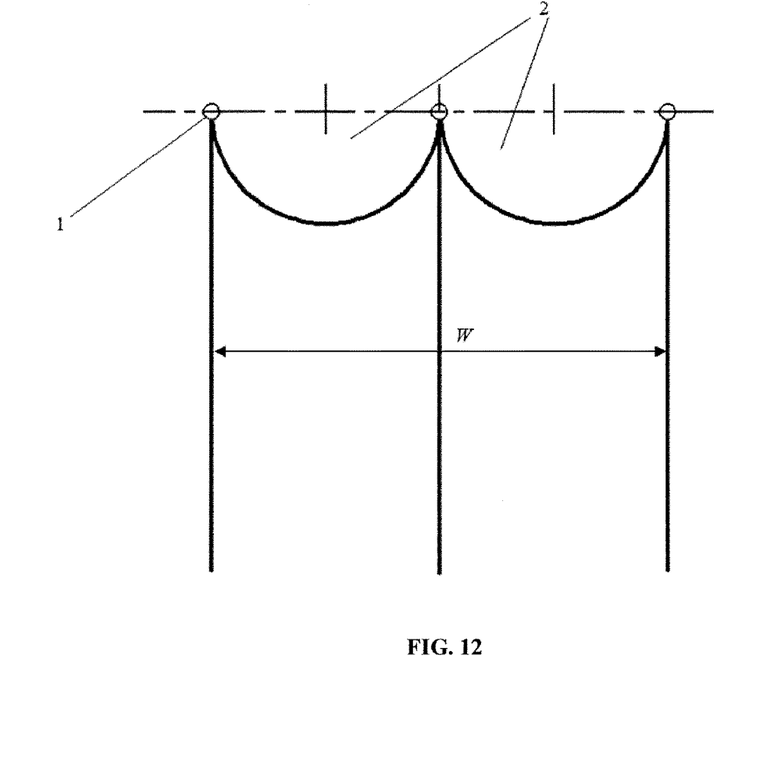
FIG. 12 shows a schematic diagram of the structure of the viaduct.

In the formula, S is the cutting area of the cultivation trough 2, as shown in FIG. 12:

$$S = \pi (W/4)^2 \quad (5)$$

In the formula, the velocity matrix unit time depends on the amount of transport medium quality V0 of each feeder scraper 34 and scraper conveyor 4:

$$Q = \frac{V_0 \cdot v_1}{L_1} \quad (6)$$

Formula (4) to (6) indicate that in order to achieve the material blanking and spreading and all aspects of the synchronous coordination, the ratio relationship between the moving speed V of the mobile car 3 and scraper conveyor V1 should be as shown below:

$$\frac{v}{v_1} = \frac{16 V_0}{L_1 \cdot \pi \cdot v \cdot W^2} \quad (7)$$

In the formula, the quality V0 is based on formula (1) and formula (2). Here, v1 is the speed of movement of the scraper conveyor 4.

Figure 11:
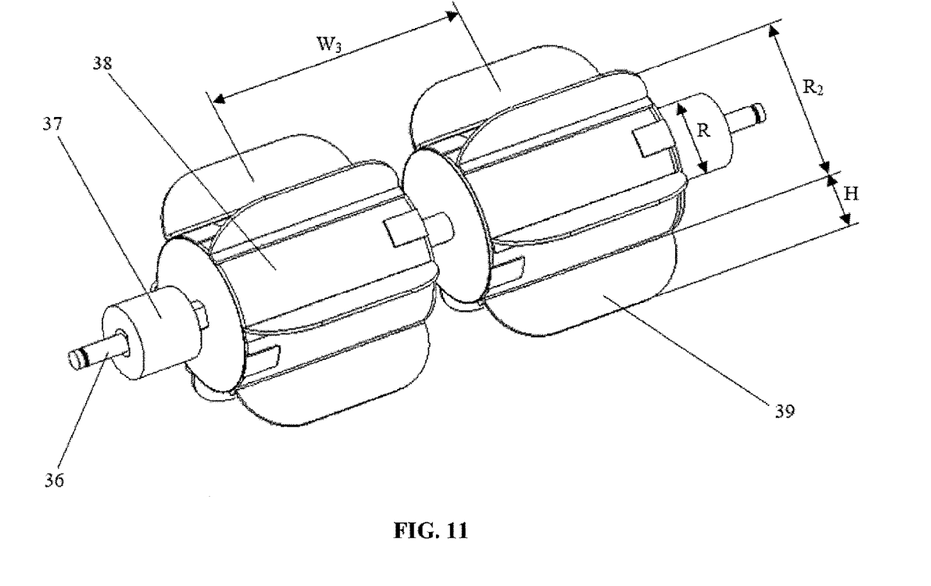
FIG. 11 shows a schematic diagram of the structure of the device.

As shown in FIG. 11, the unit time of the matrix and the time for laying out the amount of smoothing depends on the size and rotation angle of the 38 parts:

$$Q = (1-k) \cdot W \cdot \omega \cdot \pi \cdot [R_2^2 - (R_2 - H_2)^2] \cdot (R_2 + H_2/2) \quad (8)$$

In the formula, $R_2$ is the radius of 38 parts; w is angular velocity of 36 and 38 of transmission shaft; H2 is the height of the scraper 39; and K is the side gap leakage coefficient.

The rotation of the mechanism 38 is driven by the rolling of the mechanism 37 in the groove along the skeleton 1 so that the size of the elastic sleeve 37 and the traveling speed of the trolley 3 in the aisle follow the formula below:

$$\omega = \frac{v}{2\pi R_3} \quad (9)$$

In the formula, $R_3$ is the radius of the thick elastic sleeve 37.

Formula (1) to (9) show the requirements for upper material, blanking, three parts of the synchronous coordination operations, and the size of the various parts.

The invention claimed is:

1. A substrate auto-paver for table-top culture machines for packing materials, transportation, and paving, the substrate auto-paver comprising the following components:

a moving car, an automatic oblique pulling-type substrate-packing device, a substrate box, a substrate material in a cabinet, a floating-support-type double-side blanking device, and a uniform discharging device; a matrix box installed on the moving car, and a diagonal matrix automatic boxing device installed in the back side of the matrix box; the matrix box is installed between the substrate material in the cabinet and the double-side blanking device; the uniform discharging device is installed below the double-side blanking device;

the substrate material in the cabinet includes a bending-type scraper feeder, a dc motor, and a thin tension wheel; the bending-type scraper feeder has a lower part and an upper part;

the double-side blanking device comprises the matrix box, a floating trough, a push plate, a flat, a straight-moving element-mounting plate, and a level of a vertical slide rail; the front of the matrix box has two left and right symmetrical oblique dropping grooves; inside the matrix box and perpendicular to the two left and right symmetrical oblique dropping grooves, a plate is set; two floating chutes are set along the vertical slide rail and a horizontal slide rail symmetrically arranged in a substrate in front of the matrix box; an oblique chute below an opening is connected to a floating chute above the opening; a direct-moving element is vertically arranged on the straight-moving element-mounting plate along a central line of the front of the matrix box; the flat is installed at the end of the direct-moving element; and a copying discharging device comprises a flexible scraper and a mixing mechanism for even spreading; the mixing mechanism includes a support member and a bearing, a drive shaft, and a thick elastic sleeve; the drive shaft is fixed and has two evenly spread parts, and a compact elastic sleeve is installed between the bearing and the two evenly spread parts.

2. The substrate auto-paver for table-top culture, in accordance with claim 1, wherein: the diagonal matrix automatic boxing device comprises a scraper conveyor, an additional spring hook, a pin, a connecting rod, a port, a contact switch, and a lap; a shaft is fixed on the exterior of the matrix box, and a rear lateral horizontal axis is higher than the openings of the matrix box; a long pass trough opens in a conveying direction of the scraper conveyor; the rear lateral horizontal axis can cross and slide in through the long pass trough; one end of the connecting rod is hinged laterally to the matrix box; the connecting rod is installed in the middle of the pin; the scraper conveyor has a short groove in the middle in the conveying direction; the pin stretches into the short groove and can slide in it; below the scraper conveyor, the lap is fixed; a hasp is installed at a lower part of an outer wall of the matrix box; a contact switch is installed in the hasp.

3. The substrate auto-paver for table-top culture, in accordance with claim 1, wherein the bending-type scraper feeder divides into two parts because of bending action at the bending-type scraper feeder into the upper part and the lower part; and the upper part is tilted at an angle with respect to the lower part, the angle depending on a dynamic and static angle accumulation matrix.

4. The substrate auto-paver for table-top culture, in accordance with claim 3, wherein an angle of an inclined chute is greater than or equal to a dynamic stacking angle of the dynamic and static angle accumulation matrix; and wherein a dip angle of a floating drop trough is equal to a dip angle of the inclined chute.

5. The substrate auto-paver for table-top culture, in accordance with claim 1, wherein a width ($W_1$) of the oblique chute below the opening and a width ($W_2$) of the floating chute above the opening is not less than a distance (W) along an elevated cultivation bed groove along a frame; wherein the following equation applies:

$$W_2 \geq W_1 + \max(\varepsilon_1, \varepsilon_2)$$

where $\varepsilon_1$ is a maximum error in the distance along the elevated cultivation bed groove along the frame and $\varepsilon_2$ is a maximum error in a distance between two sides of the elevated cultivation bed groove.

6. The substrate auto-paver for table-top culture, in accordance with claim 2, wherein a ratio of a speed (v) of the moving car with a speed ($v_1$) of the scraper conveyor is as follows:

$$\frac{v}{v_1} = \frac{16V_0}{L_1 \cdot \pi \cdot v \cdot W^2},$$

wherein for each bending-type scraper feeder, for a quality delivery of $V_0$, the following two types of decisions are involved:

$$V_0 \geq \frac{1}{2} B_1 H_1^2 \cdot \cot(\delta_0 - \delta_1),$$

$$(B_1 \cdot \cot(\delta_0 - \delta_1) \leq L_1)$$

$$L_1 H_1 B_1 - \frac{L_1^2 B_1}{2\cot(\delta_0 - \delta_1)} \leq V_0 \leq L_1 H_1 B_1,$$

$$(B \cdot \cot(\delta_0 - \delta_1) > L_1)$$

where $H_1$ is a height of the bending-type scraper feeder, $B_1$ is a width of the bending-type scraper feeder, $L_1$ is a distance between the while scraper feeder and an adjacent while scraper feeder, and W is a distance along an elevated cultivation bed groove along a frame.

7. The substrate auto-paver for table-top culture, in accordance with claim 5, wherein the two sides of the elevated cultivation bed groove are provided with horizontal and parallel grooves along the frame, and a groove of the frame is set between the two sides of the elevated cultivation bed groove.

\* \* \* \* \*